United States Patent
Yedur et al.

(10) Patent No.: US 6,591,658 B1
(45) Date of Patent: *Jul. 15, 2003

(54) CARBON NANOTUBES AS LINEWIDTH STANDARDS FOR SEM & AFM

(75) Inventors: Sanjay K. Yedur, San Ramon, CA (US); Bhanwar Singh, Morgan Hill, CA (US); Bryan K. Choo, Mountain View, CA (US); Michael K. Templeton, Atherton, CA (US); Ramkumar Subramanian, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 09/729,297

(22) Filed: Dec. 4, 2000

Related U.S. Application Data
(60) Provisional application No. 60/243,179, filed on Oct. 25, 2000.

(51) Int. Cl.$^7$ ............... G01B 15/08; G01B 21/30; G01B 121/24; G01B 121/00
(52) U.S. Cl. ............... 73/1.89; 29/701; 438/48
(58) Field of Search ............... 73/1.89, 1.79; 250/252.1 R, 252.1 A; 438/48, 56, 57, 50, 64, 106; 29/701

(56) References Cited

U.S. PATENT DOCUMENTS

| | | | |
|---|---|---|---|
| 5,578,745 A | 11/1996 | Bayer et al. | 73/105 X |
| 5,585,211 A | 12/1996 | Firstein et al. | 430/30 |
| 5,665,905 A | 9/1997 | Bartha et al. | 73/105 |
| 5,920,067 A | 7/1999 | Cresswell et al. | 250/306 |
| 5,955,654 A * | 9/1999 | Stover et al. | 73/1.89 |
| 5,965,267 A * | 10/1999 | Nolan et al. | 423/445 R X |
| 6,126,864 A * | 10/2000 | Yokogawa et al. | 423/445 R X |
| 6,146,227 A * | 11/2000 | Mancevski | 445/24 |
| 6,331,209 B1 * | 12/2001 | Jang et al. | 423/445 R X |
| 6,346,189 B1 * | 2/2002 | Dai et al. | 73/105 X |
| 6,354,133 B1 * | 3/2002 | Yedur et al. | 73/1.89 |
| 2001/0053344 A1 * | 12/2001 | Harutyunyan et al. | 423/445 R X |

FOREIGN PATENT DOCUMENTS

WO 98/05920 * 2/1998 ............ G01B/7/34

OTHER PUBLICATIONS

"Carbon Nanotubes", Nanotube Growth, reprinted from web site at, http://bucky5.wustl.edu/Science/Nanofiber_Growth.html, 2 pages. downloaded Jun. 12, 2000.

"Specimen Interaction" reprinted from web site at, http://www.unl.edu/CMRAcfem/interact.htm, 3 pages. downloaded Aug. 21, 2000.

(List continued on next page.)

Primary Examiner—Thomas P. Noland
(74) Attorney, Agent, or Firm—Eschweiler & Associates, LLC

(57) ABSTRACT

The present invention provides systems, methods, and standards for calibrating nano-measuring devices. Calibration standards of the invention include carbon nanotubes and methods of the invention involve scanning carbon nanotubes using nano-scale measuring devices. The widths of the carbon nanotube calibration standards are known with a high degree of accuracy. The invention allows calibration of a wide variety of nano-scale measuring devices, taking into account many, and in some cases all, of the systematic errors that may affect a nano-scale measurement. The invention may be used to accurately calibrate line width, line height, and trench width measurements and may be used to precisely characterize both scanning probe microscope tips and electron microscope beams.

35 Claims, 9 Drawing Sheets

OTHER PUBLICATIONS

Scanning Electron Microscope (SEM), reprinted from web site at, http://www.unl.edu/CMRAcfem/semoptic.htm, 2 pages. downloaded Aug. 21, 2000.

"Crystalline Ropes of Metallic Carbon Nanotubes", *Science*, 273, Jul. 26, 1996, reprinted from web site at, http://cnst.rice.edu/ropes.html, 9 pages.

Energetics, Structure, Mechanical and Vibrational Properties of Single Walled Carbon Nanotubes (SWNT), Foresight Institute, reprinted from web site at, http://www.wag.caltech.edu/foresight/foresight_2.html, 9 pages. downloaded Aug. 23, 2000.

"High Resolution TEM Observations of Single–Walled Carbon Nanotubes", *Single Walled Carbon Nanotubes*, reprinted from web site at, http://www.botany.utexas.edu/facstaff/facpages/mbrown/ongres/tspires/nano.htm, 4 pages. downloaded Aug. 23, 2000.

"3 Dimensional Manipulation of Carbon Nanotubes under a Scanning Electron Microscope", Foresight Institute, reprinted from web site at, http://www.foresight.org/Conferences/MNT6/Papers/Yu/index.html, 13 pages. downloaded Aug. 11, 2000.

"Atomic and Molecular Scale Manipulation" "Using the Scanning Tunneling Microscope and Atomic Force Microscope", *Nanoscale Manipulation Using STM and AFM*, reprinted from the web at, http://home.earthlink.net/~rpterra/nt/probes.html, 16 pages. downloaded Jun. 26, 2000.

"Displacement Measuring Interferometer Systems", reprinted from web site at, http://www.zygo.com/zmi/zmi.htm, 3 pages. downloaded Aug. 11, 2000.

"Micropositioning Apparatus Using Linear Force Actuator", The University of California at Berkeley, reprinted from web site at, http://otl.berkeley.edu/UCB91016.html, 3 pages. (description of US patent No. 5,323,012 patented Jun. 1994).

"Equilibrium Structure", *Physical Properties of Carbon Nanotubes*, Reprinted from the web site at, http://www-.pa.msu.edu/cmp/csc/ntproperties/equilibriumstructure-.html, 3 pages. downloaded Jul. 19, 2000.

* cited by examiner

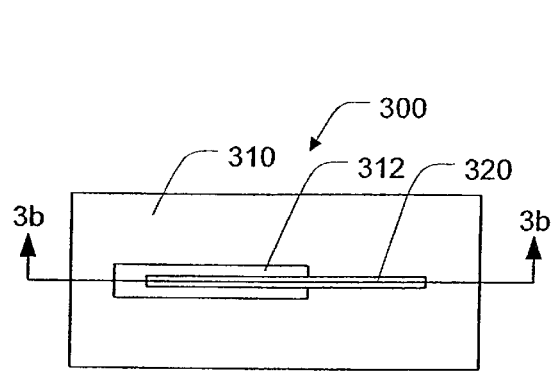
Fig. 3a
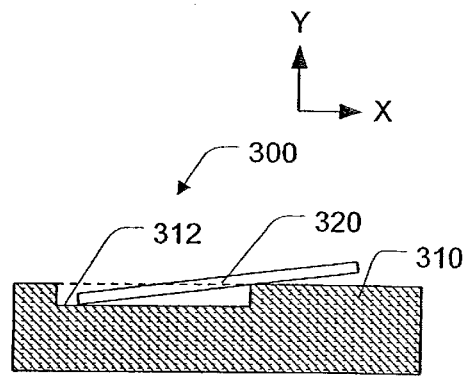
Fig. 3b
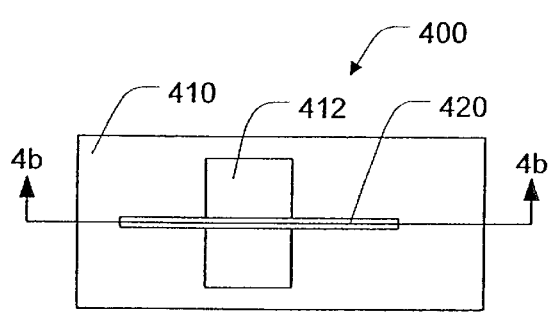
Fig. 4a
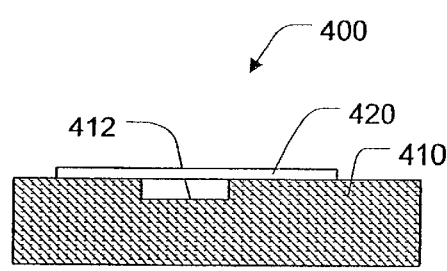
Fig. 4b
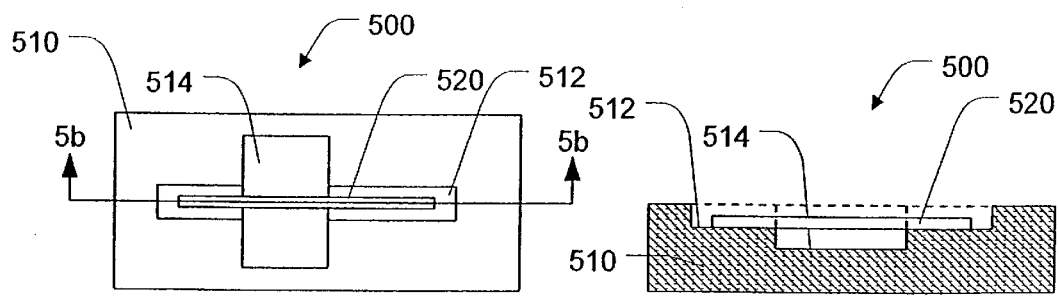
Fig. 5a                    Fig. 5b

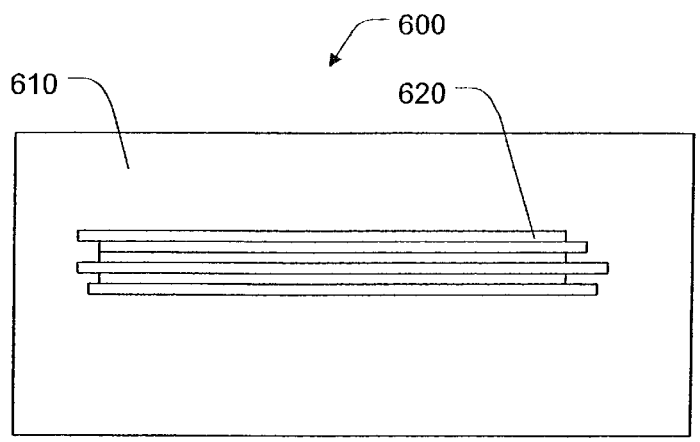
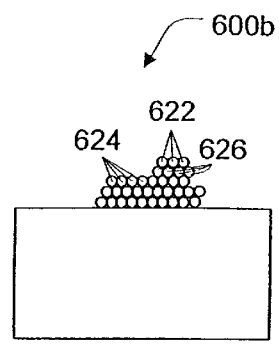
Fig. 6a    Fig. 6b
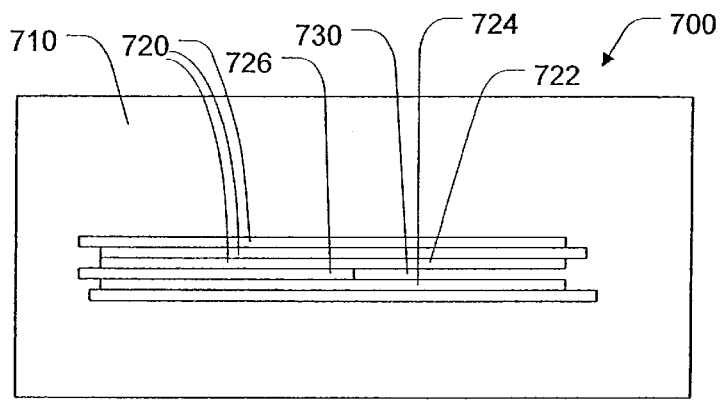
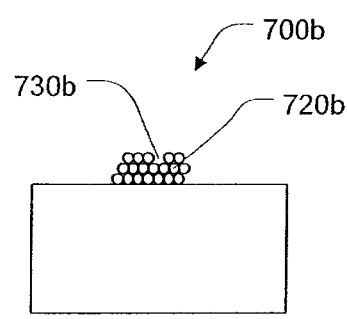
Fig. 7a    Fig. 7b
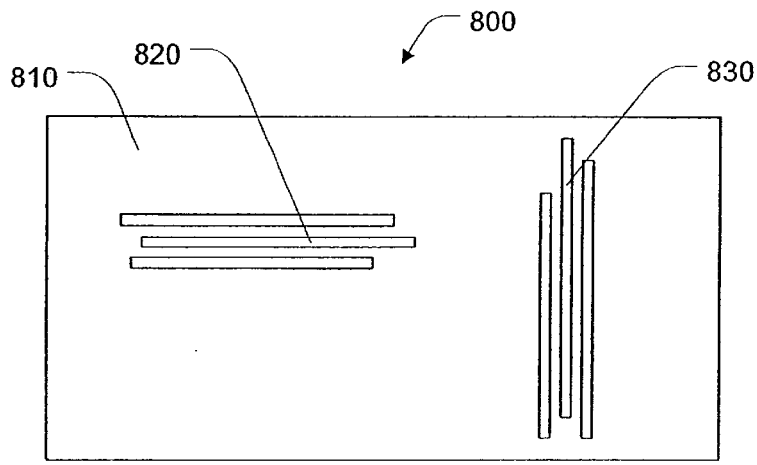
Fig. 8

CARBON NANOTUBES AS LINEWIDTH STANDARDS FOR SEM & AFM

RELATED APPLICATION

This application claims priority to Ser. No. 60/243,179 filed Oct. 25, 2000, which is entitled "Carbon Nanotubes as Linewidth Standards for SEM & AFM".

TECHNICAL FIELD

The present invention relates to nanometerology and in particular to calibration methods, calibration standards, and calibration systems for nano-scale measuring devices.

BACKGROUND OF THE INVENTION

Nano-scale measuring devices, which include electron microscopes and scanning probe microscopes (SPMs), are devices capable of making measurements with a spatial resolution of 10 nm or less. The ability to resolve small differences means that these devices are very precise. A nano-scale measuring device may be able to measure, when comparing objects, differences in feature size on the order of nanometers, or even Angstroms. Yet a very precise measurement is not necessarily an accurate one. Accuracy refers to the correctness of a measurement in absolute terms.

To obtain measurements that are accurate as well as precise, calibration of the measuring device is generally required. Calibration usually involves measurements made on samples having known dimensions or otherwise well characterized. Calibration is intended to ascertains systematic errors so that they may be taken into account in interpreting device measurements Calibration measurements are subsequently used to correct measurement data to remove or mitigate systematic errors.

The sources of systematic error and the number of measurements required to calibrate a device depend on the type of device. Consider an atomic force microscope (AFM) 200 (a type of SPM), illustrated in FIG. 1a. The atomic force microscope 200 measures the topography of a sample 210. A controller 220 directs a sample stage 230 to move the sample 210 past a detection tip 240, which is mounted on a cantilever 250. As the sample 210 moves past the detection tip 240, the sample stage 230 provides the controller 220 with feedback regarding the position of the sample stage 230 and an interferometer 260 provides the controller 220 with data regarding the height of the cantilever 250. The controller 220 combines the sample position data, the tip position data, and data regarding the tip shape to reconstruct the sample topography.

Each source of data to the controller 220 may contain systematic error. With respect to the sample position data, for example, the feedback provided by the sample stage 230 may be the number or turns in a screw that controls the position of the sample stage 230. Relating the number of turns in the screw to the actual position of the sample may introduce systematic error. With respect to tip movement data, the readings from the interferometer 260 may not have a one-to-one correspondence with the actual movement of the detection tip 240. For example, the point 252 on the cantilever 250 on which the interferometer 260 is focused moves at a different rate than the detection tip 240 if the point 252 is a different distance from the cantilever pivot point 254. Finally, because the movement of the detection tip 240 depends on the shape of the detection tip 240 as well as the topography of the sample 230, errors in data regarding the shape of the detection tip 240 lead to errors in the topography data produced by the AFM 200.

An ideal calibration of a nano-scale measuring device, one that would take into account all sources of systematic error regardless of their source, would involve making measurements on a series of calibration standards with precisely known shapes and sizes spanning the range of shapes and sizes of objects to which the instrument is to be applied. The accuracy with which the dimensions of the standards are known is ideally greater than the precision of the device being calibrated, an order of magnitude greater if possible. For nano-scale measuring devices, obtaining standards having the ideal precision and range of shapes and sizes has proven difficult, if not impossible. Available standards are not characterized with the desired degree of accuracy and are not suitable for addressing all sources of systematic error.

For example, Bartha et al., U.S. Pat. No. 5,665,905 (the "Bartha patent") provides a calibration standard for calibrating the shape of a SPM tip. The standard has a trench and a raised line, the trench having a width intended to be equal to the thickness of the line. The widths of the trench and raised line are about 500 nm and the uncertainty of these widths is at least about +/−1 nm due to the roughness of the surfaces. The SPM is calibrated by moving the calibration standard past the SPM detection tip. The measured width is based on the SPM measurements and the movements of the sample stage.

First the SPM scans a trench. Prior to entering the trench, the SPM measures a first height value, the height outside the trench. As the scanning tip enters the trench, the SPM measurement undergoes a first transition after which the SPM measures a second height, the height at the base of the trench. As the scanning tip leaves the trench, the SPM measurement undergoes a second transition as the SPM returns to measuring the first height. The measured width of the trench is considered to be the length over which the sample stage, or SPM tip, moves from the beginning of the first transition to the end of the second transition. It is expected that this measured width is less than the actual width of the trench due to the finite tip width. The first transition does not begin until a trailing portion of the tip enters the trench. The second transition begins as soon as the leading portion of the tip leaves the trench. Therefore, the measured width of the trench is approximately the actual width of the trench minus the tip width.

To complete the calibration, the raised line is scanned. As the scanning tip reaches the line, the SPM measurement undergoes a third transition as the SPM goes from measuring a third height to a fourth height. As the scanning tip passes the line the SPM measurement undergoes a fourth transitions in which the SPM returns to measuring the third height. The measured width of the line is considered to be the length over which the sample stage, or the SPM tip, moves from the beginning of the third transition to the end of the fourth transition. It is expected that this measured width is greater than the actual width of the line due to the finite tip width. The third transition begin when the leading portion of the tip reached the line. The fourth transition ends when the trailing portion of the tip passes the line. Therefore, the measured width is approximately the actual line width plus the tip width.

The two measurements may be combined to calibrate the tip width. Assuming that the actual line and trench widths are equal, the measure width of the line is approximately two tip widths greater than the measured width of the trench. The tip width is calculated by taking the difference between these two measurements and dividing by two. Applying the calibration consists of adding the calculated tip width to measured trench widths and subtracting the calculated tip width from measured line widths.

A number of factors limit the accuracy of this calibration. For example, there is the uncertainty in the line and trench widths. The calibration provides only one number, the tip width, but the tip shape may be relatively complex. Other potential sources of systematic error not taken into account include: inaccuracy in the stage or SPM tip movement measurements, differences between the line and trench widths, and difficulty in identifying the exact starts and ends of the height measurement transitions.

Another SPM calibration standard and calibration method is provided by Bayer et al., U.S. Pat. No. 5,578,745 (the "Bayer patent"). The Bayer patent calibration standard is formed by making several sharp groves in a single crystal material. The groves have well defined slopes that meet to form relatively sharp peaks. The peak radii are measured with a scanning electron microscope (SEM) or transmission electron microscopy (TEM) and are said to be known within +/−0.5 nm. SPM tip widths are calibrated by scanning across the peaks of the calibration standard. The radius of the curve measured by scanning across a peak less the peak radius is taken to be the SPM tip width. The sources of error in this calibration method, which include uncertainty in the peak radii (+/−0.5 nm) and over-simplification of the peak and SPM tip shape, are similar to the sources of error affecting the Bartha patent method.

The Bayer patent method improves over the Bartha patent by providing the possibility of partially calibrating measurements of X (distance across the sample) and measurements of Z (height of the sample). The Bayer patent provides calibration standards with deep groves having relatively well defined length to width ratios. These calibration standards may be used to calibrate the ratio between X displacement and Z displacement measurements, which is referred to as the "Z-linearity" of the SPM. If the X measurements are thought to be known accurately, this method may be used to calibrate displacements of the SPM tip in the Z-direction.

Firstein et al., U.S. Pat. No. 5,585,211 (the "Firstein patent) provides a grating of approximately equal sized lines and spaces for calibrating SEMs. The calibration relies on the accuracy of the grating period. The grating is formed using electron beam lithography with beam placement controlled by laser-based interferometry. The grating is relatively coarse and the uncertainty in its pitch is several nanometers. Thus the Firstein patent calibration standard is not very precise and has a limited range of applicability.

There remains an unsatisfied need for calibration standards having accurately known dimensions, for more accurate methods of calibrating nano-scale measuring devices, and for nano-scale measuring systems that provide more accurate measurements.

SUMMARY OF THE INVENTION

The present invention provides systems, methods, and standards for calibrating nano-measuring devices. Calibration standards of the invention include carbon nanotubes and methods of the invention involve scanning carbon nanotubes using nano-scale measuring devices. The widths of the carbon nanotube calibration standards are known with a high degree of accuracy. The invention allows calibration of a wide variety of nano-scale measuring devices, taking into account many, and in some cases all, of the systematic errors that may affect a nano-scale measurement. The invention may be used to accurately calibrate line width, line height, and trench width measurements and may be used to precisely characterize both scanning probe microscope tips and electron microscope beams.

One aspect of the invention provides a calibration standard for a nano-scale measuring device including a carbon nanotube and a substrate, wherein the carbon nanotube is adherent to the substrate.

Another aspect of the invention provides a reference standard for a nano-scale measuring device including a carbon nanotube and means for securing the carbon nanotube in a position suitable for making a calibration scan of the carbon nanotube using the nano-scale measuring device.

A further aspect of the invention provides a package having contents including a carbon nanotube and instructions for using the contents as a reference standard for a nano-scale measuring device.

A further aspect of the invention provides a method of making a calibration standard for a nano-scale measuring device including adhering a carbon nanotube to a substrate.

A further aspect of the invention provides a nano-scale measuring system including a nano-scale measuring device, a calibration standard comprising a carbon nanotube, and a controller, wherein the controller is adapted to calibrate the nano-scale measuring device using a measurement of the calibration standard made with the nano-scale measuring device.

A further aspect of the invention provides a method of calibrating a nano-scale measuring device including scanning a section of a carbon nanotube with a nano-scale measuring device to obtain scan data and calibrating the nano-scale measuring device using the scan data.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 3a is a top view illustration of a calibration standard according to an aspect of the present invention.

FIG. 3b is a cross-sectional side view illustration of the calibration standard of FIG. 3a taken along line 3b.

FIG. 4a is a top view illustration of another calibration standard according to an aspect of the present invention.

FIG. 4b is a cross-sectional side view illustration of the calibration standard of FIG. 4a taken along line 4b.

FIG. 5a is a top view illustration of another calibration standard according to an aspect of the present invention.

FIG. 5b is a cross-sectional side view illustration of the calibration standard of FIG. 5a taken along line 5b.

FIG. 6a is a top view illustration of another calibration standard according to an aspect of the present invention.

FIG. 6b is a cross-sectional side view illustration of another calibration standard according to an aspect of the present invention illustrated in FIG. 6a.

FIG. 7a is a top view illustration of another calibration standard according to an aspect of the present invention.

FIG. 7b is a cross-sectional side view illustration of another calibration standard according to an aspect of the present invention.

FIG. 8 is a top view illustration of another calibration standard according to an aspect of the present invention.

DETAILED DESCRIPTION OF THE INVENTION

Figure 1A:
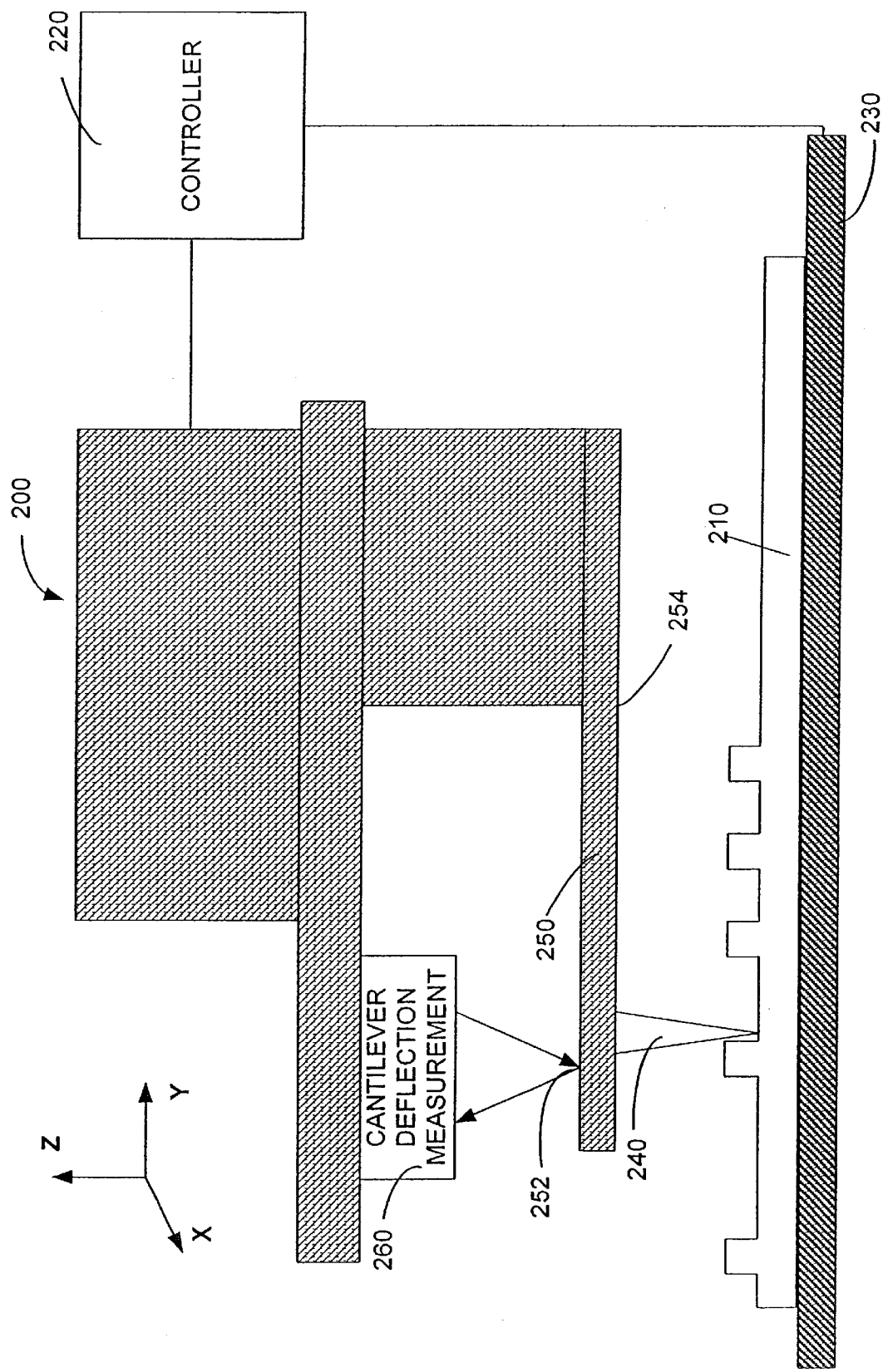
FIG. 1a is a schematic illustration of an exemplary atomic force microscope.
Figure 1B:
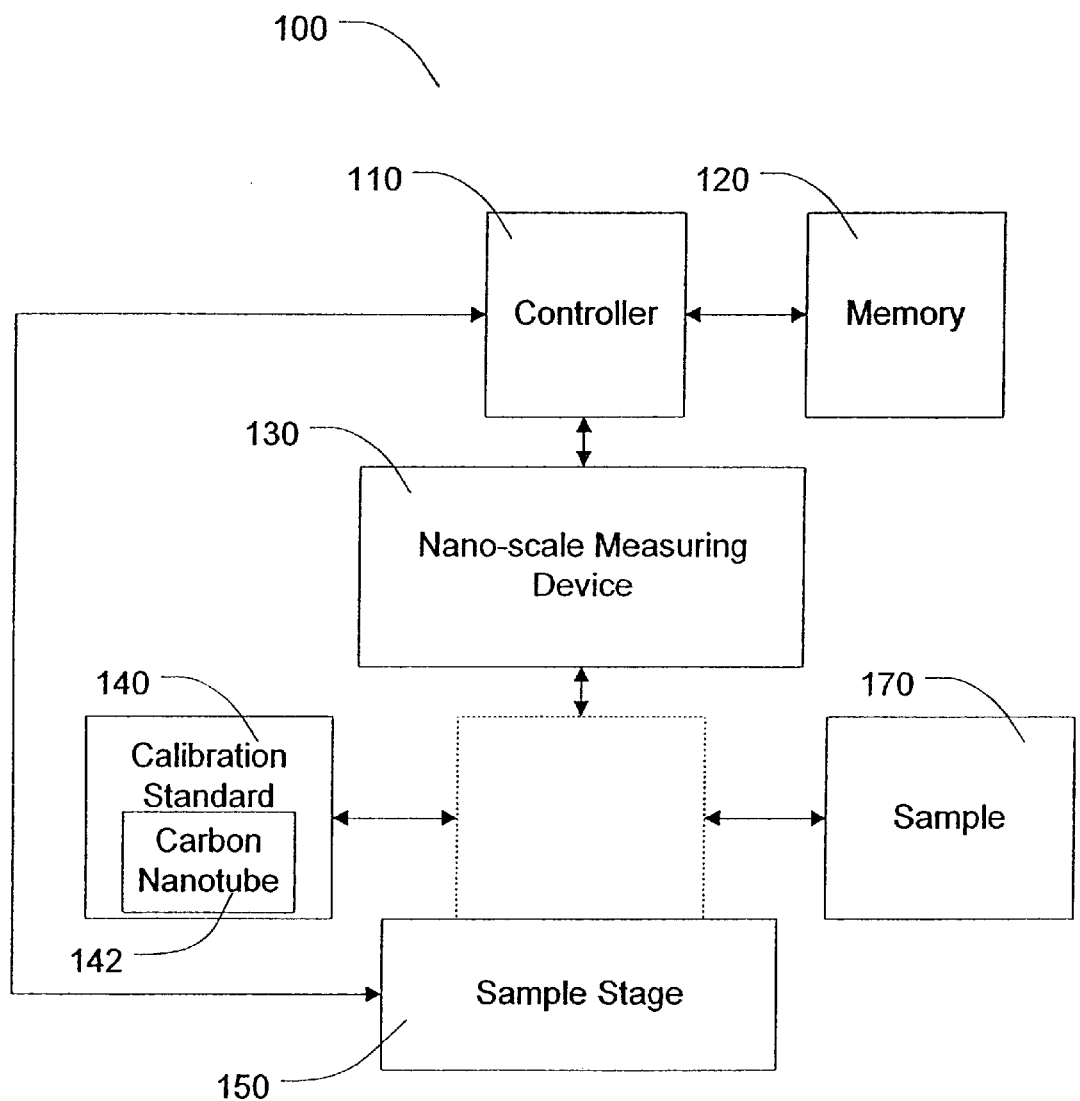
FIG. 1b is a high level schematic of a nano-scale measuring system according to one aspect of the present invention.

FIG. 1b is a high level schematic illustration of a measuring system 100 according to one aspect of the present invention. The measuring system 100 includes a nano-scale measuring device 130, a sample stage 150, a calibration standard 140, a controller 110, and a memory 120. The measuring system 100 is calibrated by placing the calibration standard 140 on the sample stage 150 and scanning the calibration standard 140 with the nano-scale measuring device 130. The controller 110 stores the calibration data in the memory 120 and uses the data to interpret data obtained by scanning an unknown sample 170 of which an accurate measurement is sought.

The calibration standard 140 includes at least one carbon nanotube. Carbon nanotubes are cylindrical structures of trivalent carbon forming hexagonal latice sheets rolled up to form hollow tubes. Nanotubes can have layered walls, but single-walled nanotubes (SWNTs) are readily obtained and are very well characterized in spacial dimension. Generally, the invention employs SWNTs. The dimensions of a SWNT are determined by its chiral vector, a two dimensional vector (n, m) that determines the geometry of the nanotube.

Figure 2:
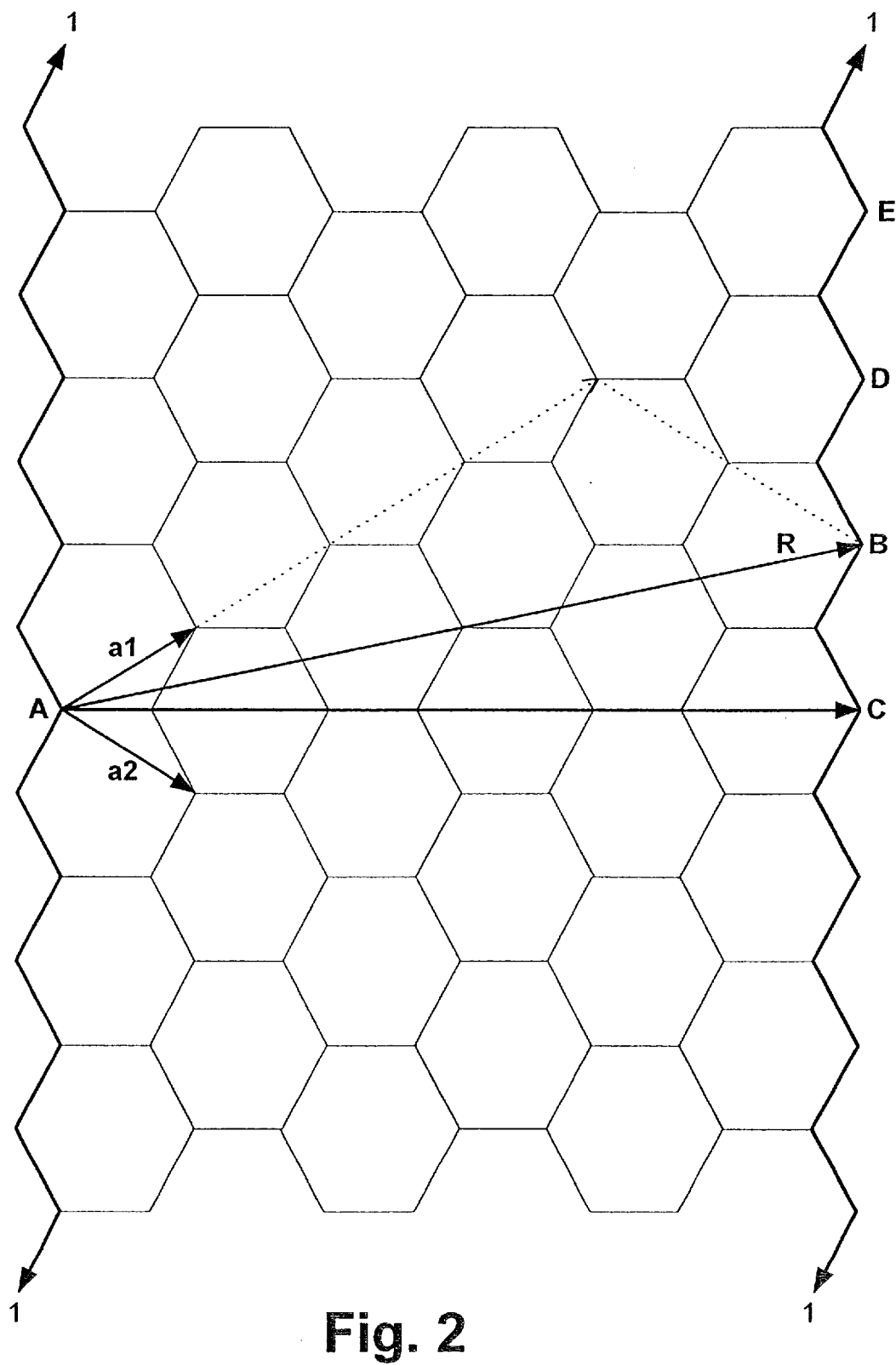
FIG. 2 is an illustration of a hypothetically unrolled carbon nanotube.

FIG. 2 illustrates a nanotube unrolled along the jagged line 1. When rolled up, the points A and B connect. The vector between connecting points A and B is the chiral vector R. The chiral vector has component unit vectors a1 and a2. These vectors are defined in terms of the armchair line, A to C. The armchair line is the shortest line that crosses the unraveled tube bisecting hexagons. The component vectors a1 and a2 lie above and below the Armchair line, as shown in the FIG. 3. The chiral vector R in this illustration equals the sum of four a1 vectors and two a2 vectors, as shown by the broken line vectors. Hence, the chiral vector for the illustrated nanotube is expressed as (4,2). If the tube were rolled so that points A and C were connected, then the chiral vector would be (3,3) and lie along the armchair line. The nanotube could also be rolled so that point A connected to point D or point E, for example.

The chiral vector precisely defines the diameter of a defect free nanotube. Where the components of the chiral vector are (n,m), the tube diameter, d, is given in nanometers by the formula:

$$d = 0.0783\sqrt{n^2 + m^2 + nm}$$

Nanotubes can be prepared with diameters ranging from a few Angstroms to several tens of nanometers. Nanotubes over about 3 nm in diameter have the disadvantage of showing a tendency to collapse. In one aspect of the invention, the nanotube diameter is from about 0.4 to about 2.7 nm. In another aspect of the invention, the nanotube diameter is from about 0.8 to about 1.7 nm. Although the above ranges are provided by way of example, other dimensional ranges also may be employed and are contemplated as falling with the scope of the present invention.

By selecting the conditions of formation, SWNTs all having the same chiral vector and few or no defects can be manufactured. A variety of manufacturing methods are available. One commonly used method is laser ablation of a heated carbon target that has been treated with a metal catalyst, usually, nickle cobalt, iron, or a mixture thereof. Another method uses a DC carbon arc to vaporize a metal catalyst impregnated carbon electrode. A selection process may be employed to sort the nanotubes based on size or defect occurrence.

Once suitable nanotubes are identified, they may be packaged with instructions that identify their suitability for use as calibration standards. Such instructions typically identify the chiral vector for the nanotubes and may also contain additional useful information such as the frequency of defects and the percentage of nanotubes that do not meet the chiral vector specification.

Nanotubes can be greater than about 10 micrometers in length, sometimes greater than about 100 micrometers. Shorter nanotubes can also be produced. In certain aspects of the present invention, it may be advantageous to have relatively short nanotubes, about 10 micrometers or less, about 1 micrometer or less, or even about 0.1 micrometer or less. Although defect free nano-tubes do not have any intrinsic bend, longer nanotubes, particularly individual SWNTs, are flexible and may curve. Shorter nanotubes exhibit less curvature and may be easier to place in specific configurations.

The calibration standard may include a substrate in association with a nanotube. The substrate may be any material that performs one or more of the following functions: supporting the nanotube, preventing the nanotube from moving during a scan, facilitating identification of the position and/or orientation of the nanotube, or providing a contrasting background (contrasting in terms of a property such as electrical conductivity or height). For example, the substrate may be an easily handled object with a relatively flat surface to which the nanotube is adherent.

A carbon nanotube may be fixed to a substrate surface in any convenient manner. Where the nanotube is bound to the substrate surface by intermolecular forces, such as hydrogen bonding, the nanotubes may become adherent to the substrate by merely dropping or placing the nanotube on the surface. Alternatively, a thin coating of a polymer solution (a solution of a polymer or polymer precursors) may be applied to the substrate surface to facilitate adherence of a nanotube. Where the polymer solution is polar, such as when the solvent is water, surface forces may prevent the nanotube from sinking even if the density of the polymer solution is less than that of the nanotube. After curing, the carbon nanotube is exposed at the surface of the polymer. Alternatively, the nanotube may be allowed to become embedded in the cured polymer as would be suitable, for example, in preparing a calibration standard for transmission electron microscopy (TEM).

Another method of adhering nanotubes to a substrate, one that may be used on a variety of substrates, is to scatter a large number of nanotubes on the surface and spray the surface with a mist of polymer solution, such as a poly methyl methacrylate solution, wherein the mist has droplet sizes that are generally smaller than the nanotube lengths. By controlling the total amount of mist to avoid covering the surface entirely, a large number of nanotubes may be trapped against the surface by the polymer at one or two ends while having exposed portions of the nanotube adjacent the substrate, which may be used in calibration.

Another method of attaching nanotubes is "nano-welding", a process carried out in an electron microscope wherein an electron beam is used to produce localized electron impact-induced dissociation and deposition of gases present in the SEM chamber. The gases deposit as a carbonaceous material that acts as a glue. Nano-welding can be used to attach a nanotube to a substrate at very specific locations.

FIGS. 3a to 8 give various examples of calibration standards. FIG. 3a is a top view illustration of a calibration standard 300 including a substrate 310 having a trench 312 extending in the X direction. Lying within the trench 312 is a nanotube 320. FIG. 3b is a cross-sectional side view illustration of the calibration standard 300 taken along line 3b in FIG. 3a. As illustrated in FIG. 3b, the nanotube 320 is longer than the trench 312 and extends out of the trench 312 and over the surface of the substrate 310, forming an angle with the surface of the substrate 310. This configuration gives the nanotube a height relative to the substrate that varies in the X direction, a property that is useful in some calibrations. In one aspect of the invention, the height of the nanotube 320 relative to the surface of the substrate 310 varies from about zero to at least about 10 nm. In another aspect of the invention, the height of the nanotube 320 relative to the surface of the substrate 310 varies from about zero to at least about 100 nm.

The substrate 310 may also include a raised portion (not shown) on which to support the end of the nanotube 320 rising above the substrate surface. The raised portion may be a raised line, formed by lithographic methods for example. The nanotube 320 may be conveniently made adherent to the substrate 310 with a polymer or other material, especially when the polymer or other material is filled into the trench 312. On the other hand, or alternatively, the nanotube 320 may be adequately adherent to the substrate 310 by Van Der Waals attraction.

FIG. 4a is a top view illustration of a calibration standard 400, which includes a substrate 410 and a nanotube 420. The nanotube 420 lies over a trench 412. The calibration standard 400 elevates the nanotube 420 over the substrate 410, as can be seen from FIG. 4b, which is a cross-sectional side view illustration of the calibration standard 400 taken along line 4b of FIG. 4a. The elevated configuration may enhance the contrast of the nanotube in an SEM image. The elevation may also be useful in SPM calibrations where the SPM detection tip dimension is large relative to the nanotube diameter, in which case it can be difficult to bring any but the endmost portion of the SPM tip into contact with the nanotube when the nanotube lies flat against a surface. Of course, having the nanotube lie flat against the substrate surface has its own advantages and in particular may permit the precise calibration of line height measurements.

A calibration standard 500, illustrated in FIGS. 5a and 5b, combines some of the ideas illustrated by the calibration standards 300 and 400. The nanotube 520 lies within a trench 512 in the substrate 510. The trench 512 helps fix the position of the nanotube 520. Another trench 514 runs perpendicular to, and is deeper than, the trench 512. The trench 514 provides a nano-scale measuring device with physical access to the nanotube 520.

FIG. 6a illustrates a calibration standard 600, which includes nanotubes 620 lying adjacent to one another on the surface of a substrate 610. The nanotubes 620 are close packed and lie approximately in a plane. In close packed arrangement, the nanotubes are held together by Van der Waals attraction, the spacing between adjacent tubes is about 0.34 nm, and the spacing between tube centers is about the tube diameter, d, plus 0.34 nm. The calibration standard 600 provides a periodic structure with a well characterized period, which is useful in calibration methods described below. Another useful property of the calibration standard 600 is that the tubes 620, in aggregate, form a structure larger than a single nanotube but still known to a high degree of accuracy. A calibration standard with an accurately known dimension larger than that of a single nanotube is useful in calibrating devices for which a single nanotube is below the device's resolution limit and too small to be used in calibration.

The calibration standard 600 can be prepared by positioning individual nanotubes on the substrate 610. Individual nanotubes may be positioned using a nanomanipulator inside an SEM, for example. A nanomanipulator may include a stage and an AFM tip. The stage may achieve precise motion control using piezoelectric motors. The AFM tip may be a tungsten or PtIr tip, for example. A nanotube may be picked up by bringing the AFM tip close to the nanotube. The nanotube jumps to the tip and is held there by Van der Waals forces. Nano-welding may also be used to secure the nanotube to the tip. With the SEM providing images, the nanotube is brought into position on a substrate generally adjacent another nanotube. Van der Waals attractions assist in so placing the nanotube and may be sufficiently strong to permit the tip to pull away from the nanotube. Alternatively, the electron beam of the SEM may be used to separate the nanotube from the AFM tip.

Another way of preparing the calibration standard 600 uses nanotube ropes. Nanotube ropes containing 100 to 500 SWNTs are routinely produced during nanotube formation. These ropes have a well-ordered, close-packed, crystalline structure. In the crystalline structure, trios of nanotubes are in triangular arrangement and groups of nanotubes can be identified which lie in essentially the same plane, which is the configuration sought for the calibration standard 600. FIG. 6b show a calibration standard 600b that includes a nanotube rope. Nanotubes 622 and nanotubes 624 each provide a group of nanotubes all lying in essentially the same plane. The utility of the calibration standard 600b may be increased by removing the nanotubes 622 and 626 to provide an extended upper layer of nanotubes all lying in approximately the sample plane.

Not every nanotube rope has a group of nanotubes all lying in one plane and exposed on an outer surface of the bundle, yet such ropes commonly occur. A suitable rope may be selected from a batch. The location of a planar group and the number of nanotubes it comprises may be determined with a SPM or SEM, for example. Optionally, as mentioned above, tubes may be removed from the bundle to improve the bundle's shape. Nanotube ropes routinely have a uniform configuration over several microns length. Such lengths far exceed what is needed for use in a calibration standard. Therefore, once a suitable nanotube rope is found or obtained, it may be cut into segments, using an electron beam for example, and used to prepare a number of well characterized calibration standards 600b.

FIG. 7a illustrates a calibration standard 700 according to another aspect of the present invention that includes nanotubes 720 lying adjacent to one another on the surface of the substrate 710 and forming a gap of controlled width 730. The gap 730 is formed by nanotubes 722 and 724, the ends of which extend beyond the end of nanotube 726. Generally, the end of a nanotube is a hemispherical cap and does not involve substantial bulging. Therefore, where the nanotubes 722, 724, and 726 are in close packed arrangement, the gap size is about d plus 0.68 nanometers. A larger gap could be formed by sandwiching two or more nanotubes between the nanotubes 722 and 724. The gap size is about 0.34+p(d+0.34) nanometers, where p is the number of sandwiched nanotubes.

FIG. 7b illustrates a calibration standard 700b, which is similar to the calibration standard 700, except that the calibration standard 700b is formed from nanotubes 720b, which are in crystalline arrangement, as in a nanotube rope, and the gap 730b may be formed by either a nanotube having an end that does not line up with the other nanotubes 720b, or by removing a nanotube entirely from the crystalline arrangement nanotubes 720b. In either case, the gap size is again about 0.34+p(d+0.34) nanometers, where p is the number of nanotubes that would be required to fill the gap.

FIG. 8 illustrates a calibration standard 800, which includes a substrate 810, nanotubes 820 and nanotubes 830. The nanotubes 820 and 830 are oriented in different directions, the orientations being defined as directions in the plane of a planar surface of the substrate 810. Including nanotubes having different orientations is useful when calibration requires scans in multiple directions, which is often the case. For example, both SPM tips and electron beams may be oval in shape such that uncalibrated scans produce results that depend on the direction in which the SPM tip or electron beam moves relative to a sample during a scan. This directional effect may be calibrated using scans in multiple directions. The calibration standard 800 permits such scans in multiple directions without having to rotate the calibration standard relative to the nano-scale measuring device.

The nanotubes 820 and 830 in the calibration standard 800 do not need to be provided in groups. On the other hand, pluralities of tubes with similar orientation may be provided in the calibration standard 800, and other calibration standards of the invention, to provide an internal check on the quality of a calibration standard. During calibration, several tubes may be scanned, whereby tubes with dimensions outside the specification, as in tubes with problematic defects or the wrong chiral vector, can be identified and excluded.

Where the calibration standard includes a substrate, it is advantageous if the substrate has a highly planar surface. If the surface is sufficiently planar, the height of a nanotube lying flat on the surface will be determined primarily by the nanotube diameter. Where the height is so defined, the calibration standard is useful in calibrating height measurements. Crystalline arrays of nanotubes on a flat substrate surface are likewise useful in calibrating height measurements.

Single crystal materials may be used to provide substrates with a highly planar surface. Single crystal silicon, for example, is often a good choice for the substrate material. The calibration standard may contain markings, optionally visible to the naked eye, that provide position and/or orientation data regarding one or more nanotubes in association with the substrate.

Depending on the type of nano-scale measuring device to be calibrated, the nanotube type may be selected to enhance contrast. For example, the electrical conductivity of nanotubes depends strongly on the chiral vector (n,m). If n–m is divisible by 3, the nanotube is considered a conductor. Otherwise, the nanotube is semiconducting. Therefore, nanotubes for which n–m is divisible by 3 might be selected, for example, along with a semiconducting substrate, such as single crystal silicon, to prepare a calibration standard with a high contrast in electrical conductivity.

The type of the nano-scale measuring device 130 is often a consideration in selecting the calibration standard 140. The nano-scale measuring device 130 may be any device capable of making measurements with spatial resolution of about 10 nm or less. In one aspect of the inventions, the resolution limit is about 1 nm or less. In another aspect of the invention, the resolution limit is about 0.3 nm or less. Examples of nano-scale measuring devices include scanning probe microscopes (SPMs) and electron microscopes. SPMs analyze samples based on short range interactions between a sample surface and a narrow detection tip. Electron microscopes analyze samples based on the interaction between the sample and one or more electron beams.

SPMs include atomic force microscopes (AFMs), scanning tunneling microscopes (STMs), and scanning near-field optical microscopes. The SPM may make measurements based on any suitable short range interaction with the sample surface, including Van der Waals forces, electrostatic forces, magnetic forces, tunneling electrons, or evanescent photons. The SPM may be operated in contact mode, non-contact mode, or tapping mode. The SPM may obtain topographical information, compositional information, material state information, or a combination of the forgoing such as compositional and topographical information.

AFMs include a sensor with a spring-like cantilever rigidly mounted at one end and having a scanning tip at a free end. AFMs may operate in contacting and non-contacting modes. In the contacting mode, the tip of an AFM is placed in low force contact with a surface of the sample. The sample and the AFM are then displaced relative one another. For example, the tip may be kept in contact with the workpiece through a downward force along the Z axis while the workpiece is displaced in the X and/or Y directions, whereby the workpiece is scanned. Alternatively, the detection tip may move while the workpiece remains stationary. As surface contours or other topographic features are encountered by the tip, the cantilever deflects. The cantilever deflections are measured and related to the relative movements of the workpiece and the detection tip, whereby the topography of the workpiece may be determined.

In non-contacting operation, the AFM detection tip is held a short distance, typically 5 to 500 Angstroms, from the workpiece surface, and is deflected during scanning by various forces between the workpiece and the tip. Such forces may include magnetic, electrostatic, and van der Waals forces. In both the contacting and non-contacting modes, measurements of workpiece topography or other characteristics are obtained from measurement of the cantilever deflection. Cantilever deflection may be measured using precisely aligned optical components coupled to deflection measurement circuitry, although other techniques are sometimes employed.

STMs include a conductive scanning tip that is held in close proximity to the workpiece, within approximately 5 Angstroms. At this distance, the probability density function of electrons on the tip spatially overlaps the probability density function of atoms on the workpiece. Consequently, a tunneling current flows between the workpiece surface and the tip if a suitable bias voltage is applied between the tip and the workpiece. The variations in the current can be measured to determine variations in the workpiece over the length of a scan. To measure surface topography, the workpiece and tip are relatively displaced in the X and/or Y directions (horizontally) while the STM attempts to maintain the distance between the tip and the surface constant (through moving the tip vertically in response to measured current fluctuations). The movements of the tip up and down can be related to the topography of a workpiece.

An STM may also be used to measure non-topographic features. Non-topographic features that may be measured by STM include features that cause variations in conductivity of the sample. Non-topographic features are measured by relatively displacing the workpiece and the detection tip in the X and/or Y directions while the tip is held a constant vertical distance from the workpiece surface. Non-topographic features are measured from fluctuations in the current that occur as the tip scans from location to location.

The above described SPMs all involve relative movement between a detection tip and a sample in the X and/or Y directions. The sample moves together with the sample stage 150, which may be any device capable of holding the calibration standard 140 or the sample 170. The detection tip may move, through the operation of piezo-electric motors for example, while the sample stage remains stationary. On the other hand, the detection tip may remain stationary while the sample stage 150 moves the workpiece in the X and/or Y directions. Piezo-electric motors, or other devices, may move the sample stage.

The system 100 of FIG. 1b may be used to calibrate data regarding the relative movements of the detection tip and the sample. The data may be feed-forward data, such as intended position, which might correspond to instructions from the controller 110. Commonly, however, the controller 110 receives feedback data regarding X and Y position of the detection tip or of the sample stage 150. Such data may be obtained, for example, using interferometers.

Where an SPM is used to measure topographical features, the system 100 may be used to calibrate measurements of feature size. The dimensions of the tip will tend to exaggerate the width of raised lines and underestimates the width of gaps, even where the sample/tip position data is accurate, or already calibrated. Similar exaggeration/underestimation is caused by the finite spacing that exists between the tip and the surface. Even in the "contacting mode" there may be a gap of several Angstroms due to atomic forces. Calibration with the system 100 may be used to compensate for these sources of systematic error.

SPM measurements of non-topographic features also warrant calibration. Where the sample has a sharp boundary at the edge of a non-topographic feature, such as an abrupt change in electrical conductivity, the SPM measurement may comprise a smooth transition. Calibration may be used to determine where within that smooth transition the actual boundary lies. For example, calibration may reveal that the boundary is where the conductivity equals ¾ times the high end measurement plus ¼ times the low end measurement.

Electron microscopes have similar calibration requirements. Electron microscopes include scanning electron microscopes (SEMs) and transmission electron microscopes (TEMs). An SEM may detect backscattered electrons, interference of backscattered electrons, secondary electrons, auger electrons, X-rays or cathodoluminescence. TEMs may detect unscattered electrons, elastically scattered electrons, or inelastically scattered electrons. The common feature of all these systems is that an electron beam is scanned across the sample and a response that varies with position over the course of a scan is measured. Like tip motion in an SPM, motion of the electron beam may warrant calibration. Like tip shape in an SPM, an electron beam has finite dimensions that may also warrant calibration.

Scanning, calibration, or both may take place under the direction of the controller 110. The controller 110 receives data from the nano-scale measuring device 130 and, in some cases, the sample stage 150. Where the data includes measurements from the sample 170, the controller 110 may transmit the data, store the data in the memory 120, and/or interpret the data in view of calibration measurements. Where the data concerns the calibration standard 140, the controller 110 may transmit the data, store the data in the memory 120, and/or interpret the data to calibrate the nano-scale measuring device 130.

The controller 110 typically includes a microprocessor, but may be any device that is capable of applying calibration data to scale or interpret measurements from the nano-scale measuring device 130. The controller 110 may be analog or digital. If the controller 110 is digital, its instructions may be implemented in either hardware or software.

The controller 110 may be configured to calibrate nano-scale measuring device 130 in response to an instruction, which may be provided by a user or may be generated automatically based on the passage of time, whether the system has recently been powered on, or any other circumstance that may indicate the need for calibration. As part of the calibration, the controller 110 may accept as an input the chiral vector for a nanotube of the calibration standard 140. The calibration process involves scanning the calibration standard and storing or interpreting the calibration data for application to measurements of the sample 170. The scan, or sequence of scans, of the calibration standard my be directed by the controller 110 as part of the calibration process. The controller 110 may also direct the loading of the calibration standard 140 onto the sample stage 150. The direction may be sent to a user or implemented through an automatic sample loading system, where the system 100 is provided with such a sub-system.

Figure 9:
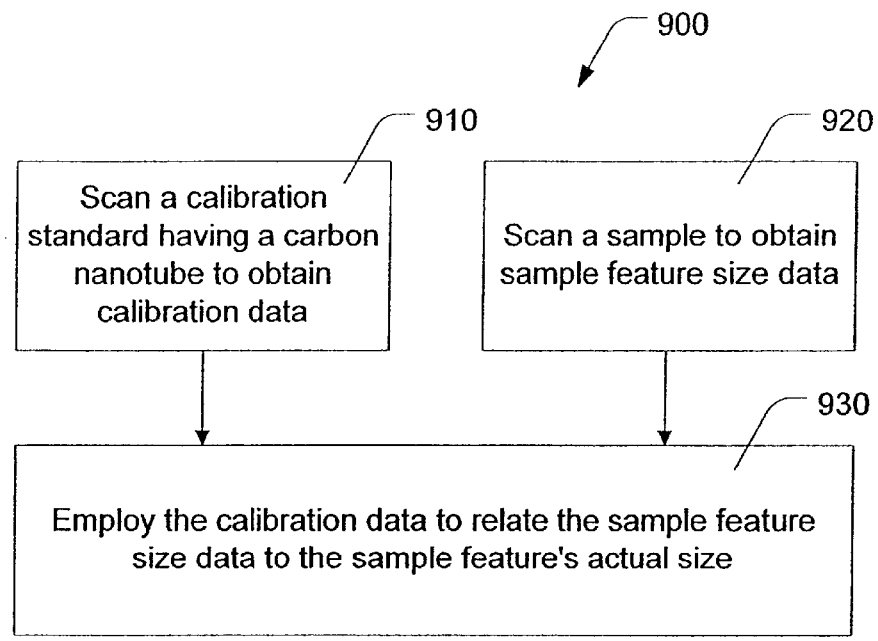
FIG. 9 is a flow diagram of a method according to an aspect of the present invention.

FIG. 9 is a flow diagram of a process 900 of calibrating a nano-scale measuring device according to one aspect of the present invention. In the step 910, a calibration standard having at least one carbon nanotube is scanned to obtain calibration data related to the nano-scale measuring device. In the step 920, which may take place before or after the step 910, a sample is scanned to obtain sample feature size data. In the step 930, the calibration data and a known dimension of the calibration standard are used to relate the measured sample feature size data to the sample feature's actual size.

The step 910 may involve scanning a single carbon nanotube, a plurality of carbon nanotubes, or any of the calibration standards described herein. A single carbon nanotube may be scanned at several points along its length to avoid results that may be affected by tube defects or contamination. Several different nanotubes from one batch of nanotubes may be scanned to take into account the possible occurrence of a tube having a type (e.g., chiral vector) deviating from the norm. One exemplary way of treating such a set of scans is to throw out those data points that deviate substantially from the mode (most commonly occurring value) and to average the remaining data points.

In the step 920, feature size data is obtained from a sample with an unknown feature size. The feature size data may be, for example, the size of a topographic feature, such as the width of a raised line, the height of a raised line, the width of a trench, or the depth of a trench. The data could also relate to a non-topographic feature, such as the width of a conductive region.

There are several options for carrying out the step 930, the step of using the calibration data to relate the sample feature size data to the sample feature's actual size. In the simplest case, a feature that gives a measured size the same as that of the calibration standard is determined to have the same size as the calibration standard. Generally, however, the size measured for the sample is not the same as the size measured for the calibration standard. Therefore, an interpolation or extrapolation takes place. For example, the calibration data may be used to compute a proportionality factor, a, between measured values $V_M$ and actual values $V_A$, such that:

$$V_A = aV_M$$

Alternatively, the calibration may be used to compute an offset factor, b, such that:

$$V_A = V_M + b$$

Or, using two or more calibration measurements, a two factor linear relationship may be developed:

$$V_A = aV_M + b$$

Other relationships, including relationships with greater numbers of parameters, may also be used. Rather than expressing the calibration relationship as a function, the calibration data may be stored in a table, for example, and measurements looked up against the table, interpolating where measurements fall between table entries.

The application of calibration data to interpretation of feature size measurements may take the form of a model, such as a model of a SPM tip shape. In this regard, the calibration may be broken down into several elements. For example, one calibration may be used to relate measured relative movement of the SPM tip and sample to actual relative movement, while another calibration may be used to characterize the SPM tip shape and correct feature size measurements for tip shape effects.

Figure 10:
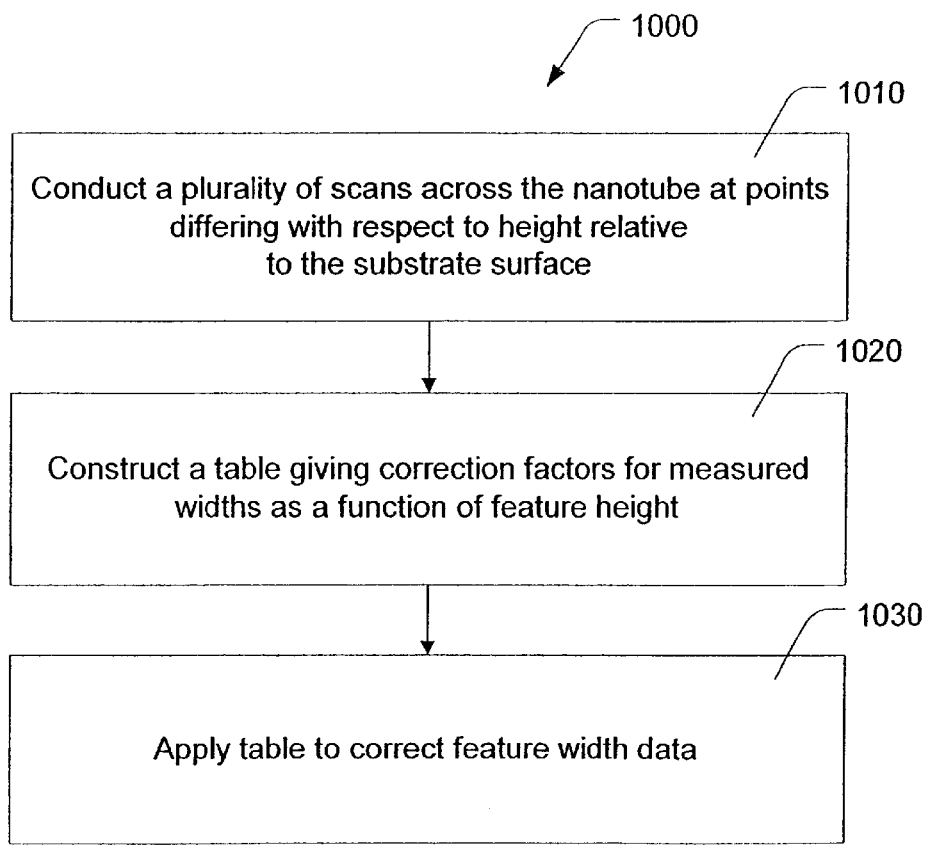
FIG. 10 is a flow diagram of another method according to an aspect of the present invention.

FIG. 10 gives an example of a calibration method 1000 that employs the calibration standard 300 illustrated by FIG. 3. The calibration method 1000 provides a table of correction factors (calibration data) for measurements of raised line widths. The correction factors relate measured widths of raised line to their actual widths. The table gives different correction factors depending on the measured height of the line. The calibration method 1000 may be applied to the calibration of an AFM and the correction factors may relate to the shape of the AFM tip.

Figure 11C:
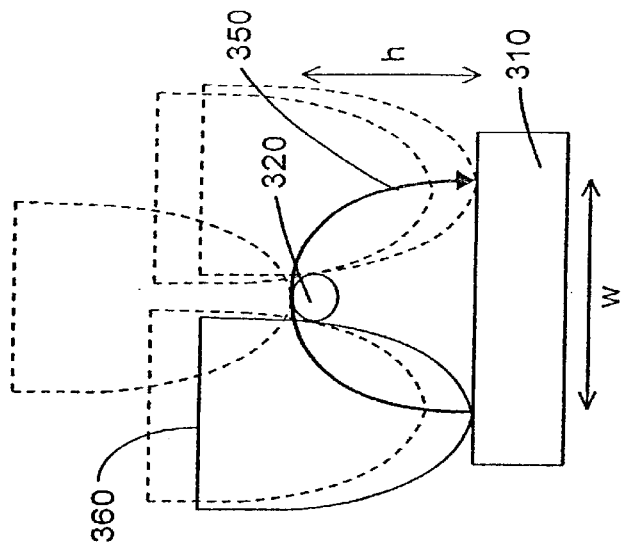
FIG. 11 is an illustration showing the variation in SPM tip scan path with height of a nanotube over a substrate.
Figure 11B:
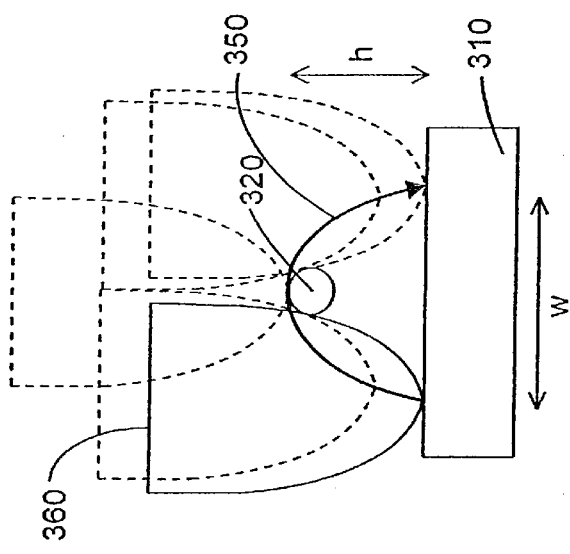
Figure 11A:
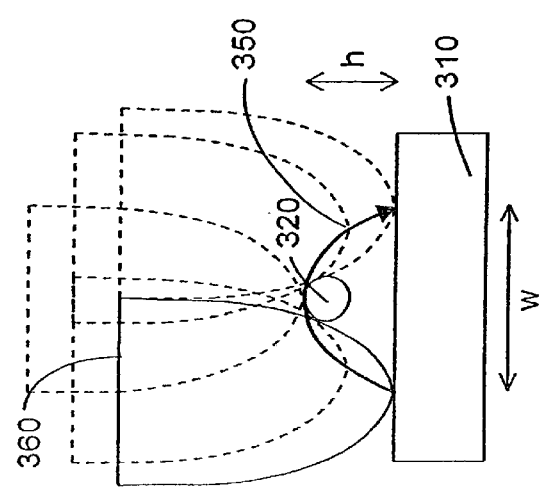

The first step in calibration method 1000, step 1010, is to conduct a plurality of scans of the calibration standard 300 at various point along the length of the nanotube 320 to measure the width of the nanotube 320 and its height relative to the substrate 310. As illustrated in FIG. 11, the width, w, associated with the nanotube 320 is measured from a path 350 taken by an AFM detection tip 360. The measured width varies with measured height, h, due at least in part to the shape of the detection tip 360. In the step 1020, a table of correction factors is prepared. To prepare the table, the known width of the nanotube 320 is subtracted from the measured widths to give correction factors. The correction factors are tabulated with respect to measured height. In the step 1030, the table is applied to measurements of a sample for which an accurate measure of line width is desired. The correction factor for the width is looked up on the table based on the measured height and the correction factor is subtracted from measured width to give the actual width.

Figure 12B:
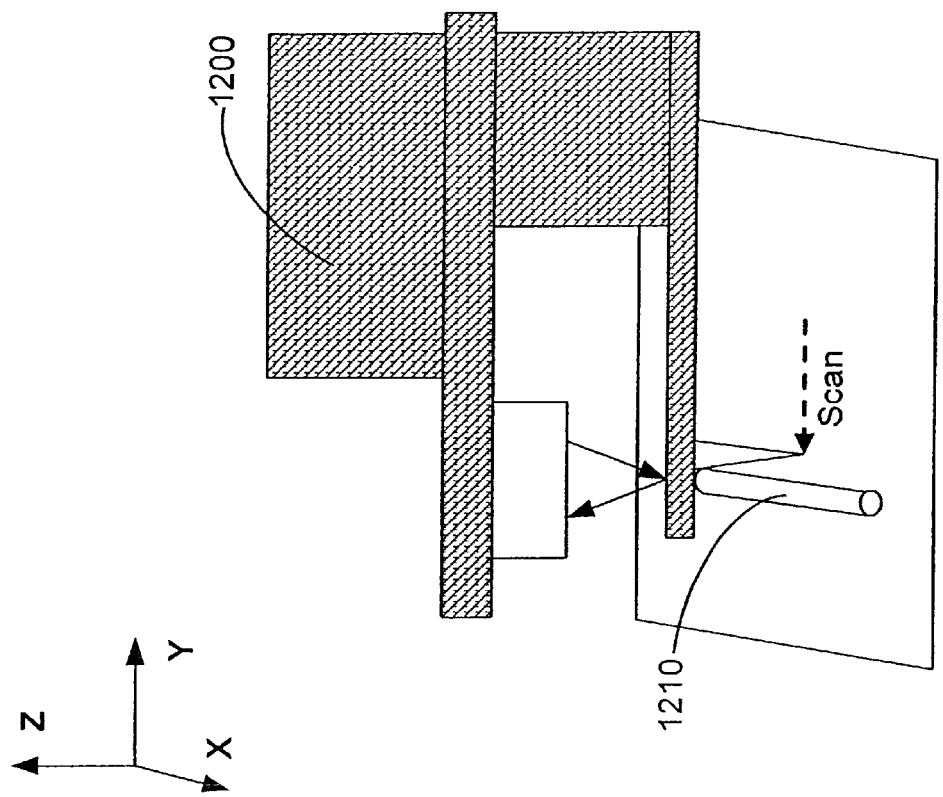
FIG. 12b is an illustration of a scan in the Y direction of a nanotube oriented in the X direction.
Figure 12A:
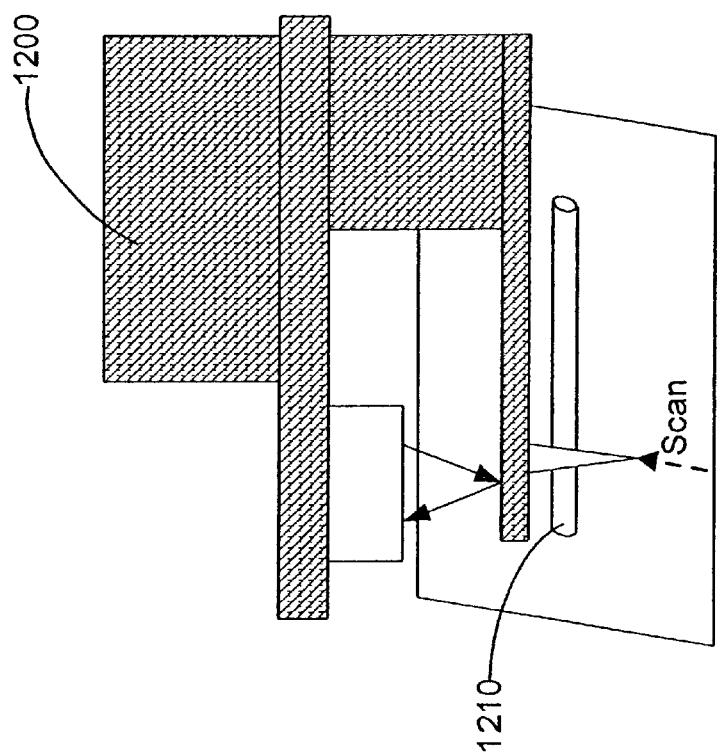
FIG. 12a is an illustration of a scan in the X direction of a nanotube oriented in the Y direction.

A calibration method, such as the calibration method 1000, can easily be extended to provide correction factors that depend on the direction of scan, thus accounting, for example, for the possibility that an AFM tip is oval or otherwise non-circular in shape. The calibration standard is scanned with varying orientations of the nano-scale measuring device relative to the nanotube. For example one scan may take place as illustrated in FIG. 12a with the axis of the nanotube oriented in the Y direction and the scan going in the X direction. Another scan may take place with the nanotube oriented in the X direction, as illustrated in FIG. 12b, after rotating the calibration standard 90 degrees for example, with the scan going in the Y direction. Correction factors may be tabulated as functions of two variables, the apparent height of the feature and the direction of the scan relative to the orientation of the nano-scale measuring device.

Figure 13:
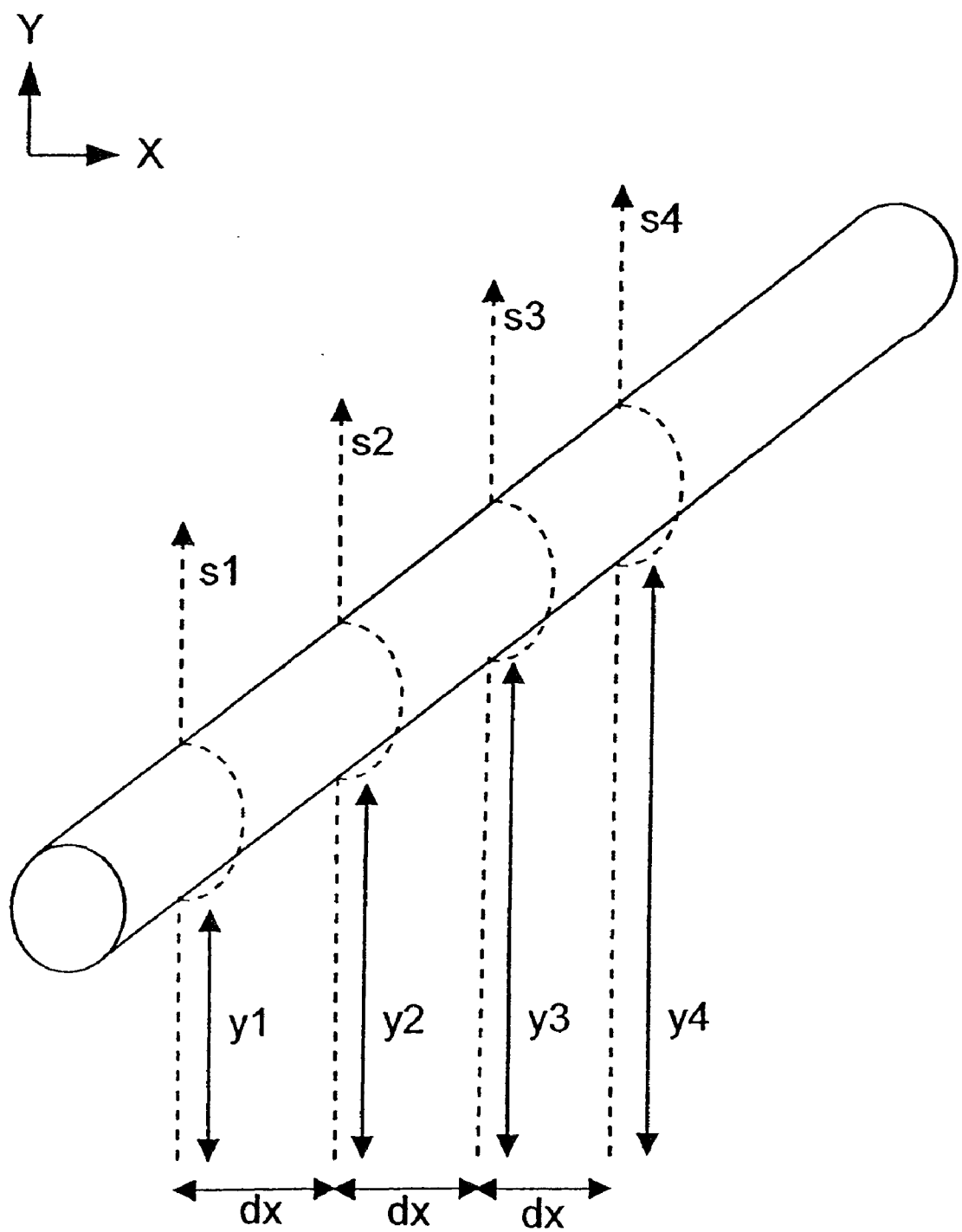
FIG. 13 is an illustration of a series of scan paths that result when a nanotube is oriented an angle relative to the scan path.

As illustrated in FIGS. 12a and 12b, the nanotube is usually scanned perpendicular to its axis. While this is convenient, it is not a requirement: the calibration may be conducted with the nanotube at an angle relative to the direction of the scan. One way to conduct such a calibration is to scan the nanotube several times at different points along its length, as illustrated in FIG. 13. Scans s1, s2, s3, and s4, all begin at the same Y position, but are spaced apart in the X direction by a distance dx. During the scan s1, the nanotube is encountered after a distance y1. During the scan s2, the nanotube is encountered after a greater distance, y2. The variation in distance along the scan path at which the nanotube is encountered gives the slope of the nanotube relative to the scan path, e.g., the slope equals (y2−y1) 1 dx. Keeping the spacing between adjacent scans, dx, short, no more than about 10 nanotube diameters for example, makes the impact of possible nanotube curvature negligible. The slope of the nanotube, together with the nanotube diameter, may be used to calculate the width of the nanotube slice that was scanned, thereby accounting for the apparent increase in width when the tube is scanned at an angle that is not perpendicular to the nanotube's axis.

The preceding example relied on the accuracy of displacement measurements (measurements of distances along the scan path) made by the nano-scale measuring system. While measurements of displacement, such as the displacement of an AFM tip relative to a sample, are often known with relatively high accuracy in comparison to measurements of feature sizes that depend on such factors as AFM tip shape or electron beam width, measurements of displacement can also be made more accurate by calibration. Such measurements may be calibrated using, for example, the calibration standard 600. A scan of the calibration standard 600 gives a measurement that is periodic with respect to distance. The exact shape of the measurement curve may depend on SPM tip shape or electron beam width, but the period of the measurement curve does not. The size of the period is determined by the nanotube diameter and the known spacing of nanotubes in close packed arrangement.

Although the invention has been shown and described with respect to a certain preferred embodiment or embodiments, it is obvious that equivalent alterations and modifications will occur to others skilled in the art upon reading and understanding this specification and the annexed drawings. In particular regard to the various functions performed by the above described components (systems, devices, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application. Furthermore, to the extent that the term "includes" is used in either the detailed description or the claims, such term is intended to be inclusive in a manner similar to the term "comprising."

What is claimed is:

1. A calibration standard for a nano-scale measuring device, comprising:
   a carbon nanotube; and
   a substrate;
   wherein the carbon nanotube is adherent to the substrate and the carbon nanotube has a chiral vector (n,m) and n–m is divisible by 3.

2. The calibration standard of claim 1, wherein the nanotube has an orientation with respect to a surface of the substrate at a point on the substrate surface and the substrate has markings associated therewith that indicate the nanotube's orientation with respect to the substrate surface.

3. The calibration standard of claim 1, wherein the carbon nanotube lies generally flat on a surface of the substrate.

4. The calibration standard of claim 1, wherein at least a portion of the carbon nanotube is raised above a surface of the substrate.

5. The calibration standard of claim 4, wherein the carbon nanotube lies across a trench in the substrate, and the surface of the substrate is at a base of the trench.

6. The calibration standard of claim 1, wherein at least a portion of the carbon nanotube is embedded in the substrate.

7. The calibration standard of claim 1, wherein the carbon nanotube is oriented at an angle relative to a surface of the substrate, whereby a height of the nanotube relative to the substrate surface varies from about zero to at least about 10 nanometers.

8. The calibration standard of claim 7, wherein the carbon nanotube is oriented at an angle relative to a surface of the substrate, whereby the height of the nanotube relative to the substrate surface varies from about zero to at least about 100 nanometers.

9. The calibration standard of claim 7, wherein the carbon nanotube lies partially within a trench formed in the surface of the substrate.

10. The calibration standard of claim 1, further comprising a plurality of carbon nanotubes in close packed arrangement.

11. The calibration standard of claim 10, wherein the carbon nanotubes are in a crystalline arrangement.

12. The calibration standard of claim 10, wherein the plurality of carbon nanotubes lie generally side by side on a surface of the substrate.

13. The calibration standard of claim 10, wherein the plurality of nanotubes form a gap having a width determined by a spacing of the carbon nanotubes in their close packed arrangement.

14. The calibration standard of claim 1, further comprising a plurality of carbon nanotubes wherein and at least one of the plurality of carbon nanotubes has a different orientation than another of the plurality of carbon nanotubes.

15. The calibration standard of claim 1, wherein the carbon nanotube is bonded to the substrate by carbon welding.

16. The calibration standard of claim 1, where in the carbon nanotube is bonded to the substrate by a polymer.

17. The calibration standard of claim 1, wherein the substrate comprises a single crystal material.

18. The calibration standard of claim 17, wherein the substrate comprises single crystal silicon.

19. The calibration standard of claim 1, wherein the substrate comprises a semiconductor.

20. A method of making a calibration standard for a nano-scale measuring device, comprising:
   adhering a carbon nanotube to a substrate, wherein the carbon nanotube has a chiral vector (n,m) and n–m is divisible by 3.

21. The method of claim 20, wherein the carbon nanotube is adhered to the substrate by:
   coating a surface of the substrate with a polymer solution;
   putting the nanotube onto the coated surface; and
   curing the polymer solution to form a polymer coating.

22. The method of claim 21, wherein the polymer solution is polar.

23. The method of claim 21, wherein the nanotube does not sink into the polymer solution.

24. The method of claim 20, wherein the nanotube is exposed at the surface of the polymer coating.

25. The method of claim 20, wherein the carbon nanotube is adhered to the substrate by carbon welding.

26. A method of making a calibration standard for a nano-scale measuring device, comprising:
   adhering a carbon nanotube to a substrate wherein the carbon nanotube is adhered to the substrate by:
     depositing the carbon nanotube on a surface of the substrate;
     spraying the surface with a mist of polymer solution, the mist having droplets smaller than the nanotube length; and
     curing the polymer solution.

27. The method of claim 26, wherein the substrate has a surface with a trench formed into it and at least part of the carbon nanotube is placed within the trench.

28. The method of claim 27, wherein the nanotube is longer than the trench.

29. The method of claim 27, wherein the nanotube is placed entirely within the trench.

30. The method of claim 27, wherein the trench is filled at least partially with a polymer solution, which is then cured.

31. The method of claim 26, wherein the carbon nanotube is part of a crystalline arrangement of nanotubes.

32. The method of claim 31, further comprising removing one or more nanotubes from the crystalline arrangement of nanotubes.

33. The method of claim 26, further comprising placing a plurality of carbon nanotubes side by side on the surface of the substrate.

34. A calibration standard for a nano-scale measuring device, comprising:
   a carbon nanotube; and
   a substrate;
   wherein the carbon nanotube is adherent to the substrate and the carbon nanotube has a chiral vector (n,m) and n equals m.

35. A calibration standard for a nano-scale measuring device, comprising:
   a carbon nanotube; and
   a substrate;
   wherein the carbon nanotube is adherent to the substrate and the carbon nanotube has a chiral vector (n,m) and n is greater than m.

* * * * *

UNITED STATES PATENT AND TRADEMARK OFFICE
CERTIFICATE OF CORRECTION

PATENT NO. : 6,591,658 B1
DATED : July 15, 2003
INVENTOR(S) : Sanjay K. Yedur et al.

It is certified that error appears in the above-identified patent and that said Letters Patent is hereby corrected as shown below:

Column 1,
Line 30, please replace the word "ascertains" with the word -- ascertain --
Line 32, please insert a period after the word "measurements"

Column 2,
Line 50, please replace the hyphenated word "tions" with -- tion --
Line 56, please replace the word "begin" with the word -- begins --
Line 57, please replace the word "reached" with the word -- reaches --

Column 3,
Lines 15, 16 and 32, please replace the word "groves" with the word -- grooves --

Column 5,
Line 22, please add the word -- at -- after the word "oriented"

Column 8,
Line 50, please replace the word "show" with the word -- shows --
Line 65, please add the word -- in -- after the word "microns"

Column 14,
Line 31, please replace the phrase "1 dx" with the phrase -- / dx --

Signed and Sealed this

Ninth Day of September, 2003

JAMES E. ROGAN
*Director of the United States Patent and Trademark Office*